(12) United States Patent
Izuhara et al.

(10) Patent No.: US 11,125,618 B1
(45) Date of Patent: Sep. 21, 2021

(54) PHOTONIC INTEGRATED SPECTROMETER WITH TUNABLE DISPERSIVE ELEMENT AND METHOD OF USING SAME

(71) Applicant: SCIDATEK INC., Austin, TX (US)

(72) Inventors: Tomoyuki Izuhara, Pleasanton, CA (US); Louay Eldada, Austin, TX (US)

(73) Assignee: SCIDATEK INC., Austin, TX (US)

( * ) Notice: Subject to any disclaimer, the term of this patent is extended or adjusted under 35 U.S.C. 154(b) by 0 days.

(21) Appl. No.: 16/912,750

(22) Filed: Jun. 26, 2020

(51) Int. Cl.
  G01J 3/28  (2006.01)
  G01J 3/02  (2006.01)
  G02B 6/42  (2006.01)

(52) U.S. Cl.
  CPC .............. *G01J 3/0256* (2013.01); *G01J 3/28* (2013.01); *G02B 6/4201* (2013.01)

(58) Field of Classification Search
  CPC .... G01J 3/0256; G01J 3/02; G01J 3/28; G01J 3/26
  See application file for complete search history.

(56) References Cited

U.S. PATENT DOCUMENTS

| | | | |
|---|---|---|---|
| 3,011,391 A | 12/1961 | Fastie | |
| 3,739,295 A * | 6/1973 | Shah | H01S 3/0812 372/20 |
| 6,169,838 B1 | 1/2001 | He | |
| 7,257,288 B1 * | 8/2007 | Strasser | G02B 6/2706 385/24 |
| 9,651,422 B2 | 5/2017 | Saptari | |
| 2009/0046288 A1 | 2/2009 | Calls | |
| 2014/0092385 A1 | 4/2014 | Nitkowski | |
| 2019/0310377 A1 * | 10/2019 | Lodin | G01S 17/42 |

FOREIGN PATENT DOCUMENTS

| | | |
|---|---|---|
| WO | 2017/087390 | 5/2017 |
| WO | 2018/011035 | 1/2018 |
| WO | 2018/085360 | 5/2018 |

OTHER PUBLICATIONS

Huang et al., Miniature Broadband NIR Spectrometer Based on FR4 Electromagnetic Scanning Micro-Grating, Micromachines vol. 11, pp. 393-404, (2020).
Xie et al., Silicon Nitride/Silicon Dioxide Echelle Grating Spectrometer for Operation Near 1.55 µm, IEEE Photonics Journal vol. 10, No. 6, (2018).
Ryckeboer et al., CMOS-compatible silicon nitride spectrometers for lab-on-a-chip spectral sensing, Proceedings of SPIE vol. 9891, No. 1K, pp. 1-9 (2016).
Rahim et al., Open-Access Silicon Photonics Platforms in Europe, IEEE Journal of Selected Topics in Quantum Electronics vol. 25, No. 5, pp. 1-18 (2019).

* cited by examiner

*Primary Examiner* — Abdullahi Nur
(74) *Attorney, Agent, or Firm* — Pierson IP, PLLC

(57) ABSTRACT

A photonic integrated circuit (PIC) spectrometer for sensing the spectroscopic signature of airborne molecules, comprising a dispersive element to separate the spectral information spatially, and a tuning mechanism for said dispersive element to convert the spectral information to time-dependent information. The approach allows the PIC spectrometer to have a single (or a few) output pin(s), enabling sensing of the environment with a simple packaged chip that is compact, lightweight, energy efficient and low cost, making it suitable for platforms that have a small form factor, a small power budget, and are cost sensitive, such as mobile devices.

9 Claims, 9 Drawing Sheets

PHOTONIC INTEGRATED SPECTROMETER WITH TUNABLE DISPERSIVE ELEMENT AND METHOD OF USING SAME

FIELD OF THE INVENTION

The present embodiments generally to the field of environment sensing, and more particularly to the use of photonic integrated circuit (PIC) technology for the realization of compact lightweight low-power-consumption low-cost packaged optical spectrometers.

BACKGROUND

A spectrometer is a device that provides wavelength information on input signals. A spectrometer is used in many applications including scientific research of chemical and biological materials, sensing, and optical engineering. A spectrometer operates at various wavelength ranges, such as visible light, ultraviolet, and infrared. A spectrometer uses a diffractive element to separate input signals into several signals, each containing information on a spectral band within the larger wavelength range measurable by the device. Input signal formats include free-space propagated light and guided light in optical fibers.

Sensors became ubiquitous and the demand for small size, light weight, low power consumption, high performance sensors is high. A spectrometer can be used in different types of sensors to improve the performance and add valuable information. Advancement of the Internet of Things (IoT) and Internet-connected sensors increased the need for devices with small size, low power consumption and light weight. Moreover, the advancement of mobile applications running on mobile phones, tablets, robots, drones, and autonomous vehicles further enhanced the importance of such sensors.

However, existing spectrometers are bulky, heavy, expensive and have high power consumption. For example, a monochromator used in scientific research or chemical analysis is usually a fixed, desktop apparatus. A small size spectrometer based on bulk optics components is commonly in a few centimeters size block. They may have adequate performance levels, but they are not suitable for modern, mobile, network-connected applications. The embodiments aim to solve these issues.

A spectrometer system usually consists of optical systems to handle optical signals, a dispersive element to separate spectral information into, for example, in spatial position, and detection systems to capture the optical signal.

Conventional spectroscopy instruments such as monochromator described in, for example, U.S. Pat. No. 3,011,391, consist of bulk optical elements including lens system, mirrors, slits, and grating plate as a dispersive element. Spectral information is obtained from mechanically adjusting the dispersive element's position and/or angle or position of slits. This type of system is able to capture spectral information of input optical signals in time-varying electrical output signals. However, due to the size limitation of used optical elements and mechanical properties, the size and weight of the system is large and heavy. U.S. Pat. No. 9,651,422 is a more recent variation of such a system and uses tunable filters, for example a mechanical rotational grating, to achieve the same function. But with bulk optical elements and mechanical parts, the size limitation of this design is obvious.

There are attempts to design small size spectrometers, for example in Huang et al., 2020. However, the use of bulk optical elements limits the ultimate achievable size of the total system and alignment process in the assembly steps makes it a higher cost device.

Integrated photonics-based spectrometers have been investigated in various platforms and system designs. For example, Xie et al., 2018 investigated a spectrometer design in Silicon Nitride platform using Echelle grating as a dispersive element. In such system design, to capture the complete spectral information, a large number of photodetectors must be used at the output of the optical signal. This limits the ultimate size and the cost such a system can achieve. A similar system design with a large number of photodetector arrays is described in prior art such as U.S. Pat. No. 6,169,838, US Pat. No. 2009/0046288 A1, international patent WO 2018/011035 A1, US Pat. No. 2014/0092385 A1, international patent WO 2018/085360 A1.

International patent WO 2017/087390 attempts to use integrated photonics platforms for spectrometers also. In its system design, spectral decomposition is done at the free space to PIC couplers, then each signal is modulated to recover at the later stages. The resolution and data points are tied to the number of input couplers for this design, for performance spectrometer, it requires a large number of such functional elements and causes the larger system size and possibly higher power consumption too.

In integrated photonics platforms, the use of array waveguide grating (AWG) design for spectrometer function is also common. For example, Ryckeboer et al., 2016 described the use of AWG to achieve integrated photonics spectrometers. However, the AWG in such systems is used as a static dispersive element. Large number of photodetectors is required to capture the complete spectral information for this type of system design too. To control, detect, and output the signal from the large number of photodetectors, such a system requires a large number of pins or output ports to connect to the external systems. Even if we attempt to handle multiplexing or digitizing the multiple output signal in internal systems, the size of multiple photodetectors inside limits the size, cost and power consumption and the internal system increases the cost and power consumption significantly.

Photonic integrated circuits (PIC) have been developed over the last few decades. It utilizes material systems which have unique optical and electrical properties to achieve functions required for optical instruments, optical communication, optical sensors and more. The materials for PIC evolved toward more CMOS compatible systems lately. Silicon-based PIC, or silicon photonics, has been the main focus of the PIC R&D community and industry. Other material systems include III-V semiconductors, metal oxides, glasses, and organics. PIC commonly uses waveguide-based devices realized in planar format, then waveguides connect these functional elements to realize more complicated functions. For the purpose of this background description, the review article by Rahim et al. 2019 and textbook by Nishihara et al. are listed.

SUMMARY

A photonic integrated circuit (PIC) spectrometer for sensing the spectroscopic signature of airborne molecules, comprising a dispersive element to separate the spectral information spatially, and a tuning mechanism for said dispersive element to convert the spectral information to time-dependent information. The approach allows the PIC spectrometer to have a single (or a few) output pin(s), enabling sensing of the environment with a simple packaged chip that is compact, lightweight, energy efficient and low cost, making it suitable for platforms that have a small form factor, a small power budget, and are cost sensitive, such as mobile devices.

DESCRIPTION OF THE DRAWINGS

The following drawings are illustrative of embodiments of the present embodiments and are not intended to limit the embodiments as encompassed by the claims forming part of the application.

DETAILED DESCRIPTION

Embodiments realize compact, lightweight, low-cost, low-power-consumption packaged optical spectrometers.

A spectrometer that is compact, lightweight and energy-efficient can be realized using photonic integrated circuit (PIC) technology for various optical spectral ranges. The planar PIC format provides fully integrated devices with the benefits of small size, light weight, and stable operation. PIC platforms use CMOS (complementary metal-oxide-semiconductor) compatible fabrication processes, which make them scalable solutions for high volume production at low cost. Assembly processes of such devices have been developed and have been available in the optical communication device industry for decades.

The prior art includes inventions and publications of PIC spectrometers in the background section, however they require a large number of output ports and pins to satisfy the performance level required for practical applications. This requirement limits the size of the device and prohibits the use in mobile applications.

The present embodiments makes it possible to produce a low-pin-count spectrometer, resulting in a compact, lightweight, energy-efficient, low-cost device. When the dispersive element in the system is tunable by an electronic control signal, the PIC spectrometer can have a single or a few output ports. The tunable dispersive element converts the spectral information to time-dependent information, and the signal can be output as a time-varying, periodic signal with spectral information that requires only a single (or a few) output pin(s). The conversion scheme is sometimes used in conventional, desk-top spectrometers. Embodiments may combine the signal format and PIC platform to achieve compact, lightweight, energy-efficient, low-cost spectrometers.

Figure 1:
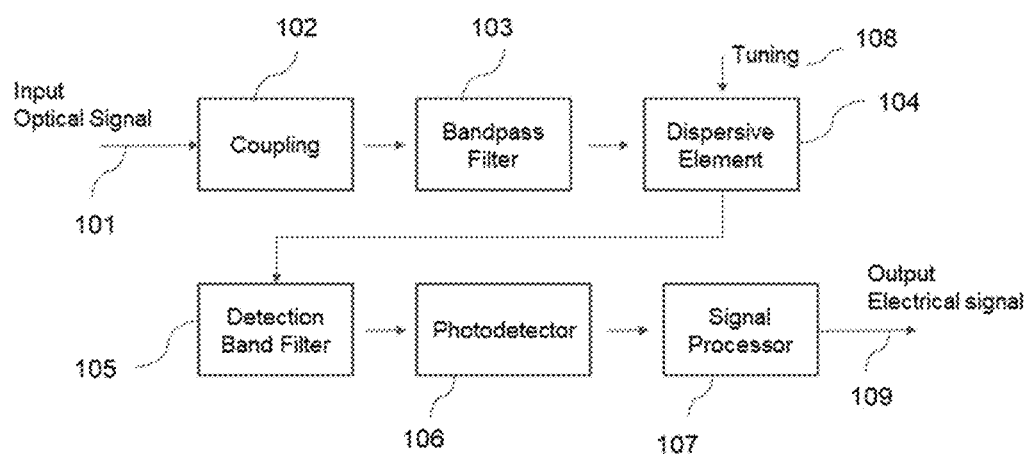
FIG. 1 depicts a schematic diagram of the PIC spectrometer architecture. Each box is labeled with the function it represents.

Embodiments may include the following functional elements shown in FIG. 1: input port(s) 101, coupling into PIC(s) 102, optical filter(s) 103 to select the spectral range of interest, dispersive element(s) 104 with tuning capability 108, detection optical filter(s) 105, photodetector(s) 106, signal processing 107 and output port(s) 109. Each function can be implemented using various device designs that can be integrated in the PIC platform.

Figure 2:
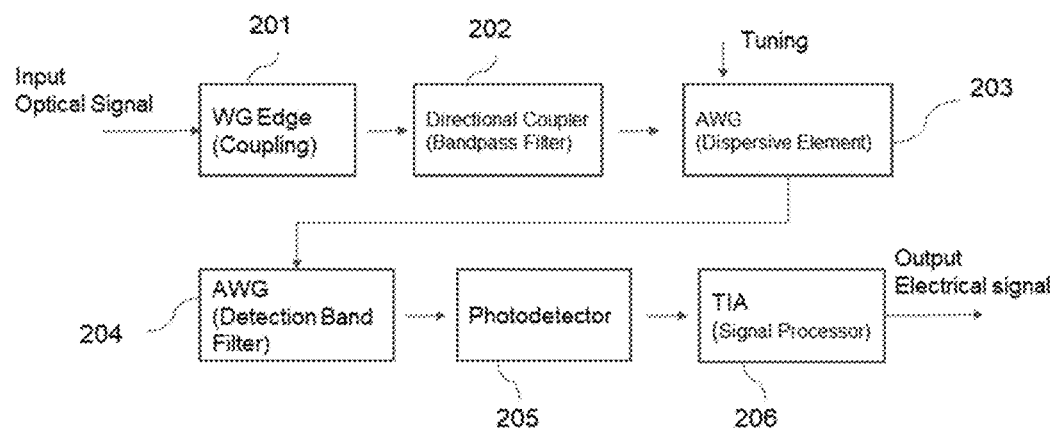
FIG. 2 depicts a schematic diagram of the PIC spectrometer architecture. An example of actual implementation of the system using AWG as a dispersive element.
Figure 3:
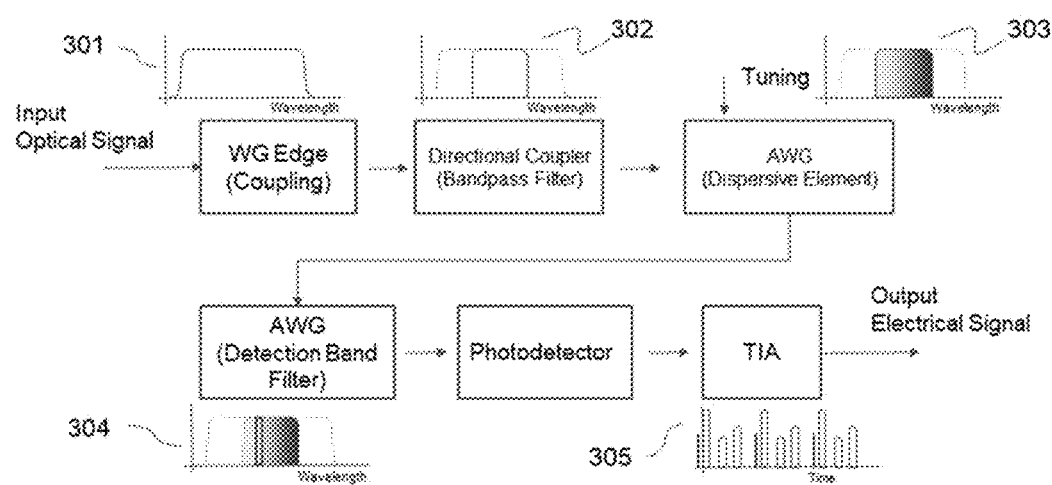
FIG. 3 depicts a schematic diagram of the PIC spectrometer. The accompanying plots indicate the steps of signal processing in terms of its spectral information.

A potential embodiment within the scope of the present embodiments may include the following designs for the functional elements shown in FIG. 2: an input window with anti-reflection (AR) coating, a lens, waveguide edge coupling 201, a directional coupler filter 202, an arrayed waveguide grating (AWG) for both dispersive function 203 and for detection band filter 204, a photodetector 205, and transimpedance amplifier (TIA) 206. In this example configuration, an input optical signal enters through the AR coated window into a packaged PIC spectrometer, a lens focuses the signal onto the PIC waveguide at the input facet of the PIC chip. The signal propagating in the waveguiding structure goes through a directional coupler which allows through it only a certain wavelength range signal, so as to act as a bandpass filter. This function is required to limit the spectral range of the signal entering the next stage of the system, since the AWG cannot separate signals in different diffraction orders. Then the AWG images the spectral components of the input signal onto the free-propagation region output ports. The tunability of the AWG is achieved by adding phase changing elements at the grating waveguide arms. By tuning the AWG, the wavelength at a single output port of the AWG scans within the spectral range under measurement. FIG. 3 depicts the signal processing steps in each of the functions in the system in wavelength domain and the time domain at the output of the device. The input optical signal contains its natural spectral components 301. At the first step, the bandpass filter limits the signal spectrum into the range of interest of the specific application and also the range the later steps can operate without interference 302. The dispersive function projects the spectral components in spatial domain 303, in case of AWG the position at the output waveguides. The detection band filter, AWG output waveguides, selects a portion of the signal spectrum 304 for the detection at the photodetector. Due to the tunability of the dispersive function, AWG in the example, the output is a time-varying, periodic signal 305 which contains the input optical signal's spectral information assuming periodic tuning of the dispersive element. This embodiment is simply an example, various other sets of designs are possible for the functional elements.

The input coupling designs include, but are not limited to: an input window with anti-reflection (AR) coating, a refractive lens, and waveguide edge coupling; an input window with AR coating, a diffractive optical element (DOE), and waveguide edge coupling; an input window with AR coating, a holographic optical element (HOE), and waveguide edge coupling; an optical window and a grating that couples into the waveguiding structure; an optical fiber coupled via edge coupling to the waveguiding structure; and an optical fiber coupled to the waveguiding structure via a grating.

The initial bandpass filter designs include, but are not limited to: a directional coupler filter; a grating (typically when also used for coupling); a multimode interference (MMI) coupler; a Mach-Zehnder interferometer (MZI); an AWG; a thin film filter. The initial bandpass filter has the passband width which matches the spectral range the following dispersive element can cover.

The dispersive element designs include, but are not limited to: an AWG; a grating; a prism. The output of these elements is coupled into output waveguides. The dispersive element has a wavelength tuning capability so that conversion of spectral information into time dependent signal is achieved. The tuning indicates the ability to control the properties of spectral information coupled into output waveguides, here mainly wavelength range, or spectral width of signal. The tuning is controlled by electrical signals from external sources, although the actual tuning may be due to electro-optical, thermo-optical, magneto-optical, or mechanical format. For example, in silicon based waveguide systems, thermo-optical effect is used to adjust phase of propagating optical signals. The designs are available to achieve low power consumption less than a few mW and high speed in kHz range. The high speed tuning capability allows various operation modes of this device to optimize the amount and quality of information obtained.

The output waveguide from the dispersive element is coupled to a photodetector. The coupling method can be via free space, for example, using a grating structured waveguide and a discrete photodetector. This is a low cost configuration since numerous options are available for the discrete photodetector components. However, assembly cost could be higher for the optical alignment between the chip and discrete photodetector. An integrated photodetector is available in the PIC platform; the output waveguide has a light sensing section at the end of the structure. In this example, the photodetector is an integrated part of the PIC chip so that there is no need for an alignment process at device assembly, although the PIC chip cost may be higher for the additional integration steps. The photodetector(s) needs to be suitable to the wavelength ranges of interest, mainly the difference is the material used, for example Si, Ge, GaAs, InGaAs, InP etc.

These functional elements are waveguides based designs or it is possible to couple the signal from the elements to waveguide or vise versa. Then on the PIC platform, any combination of these designs is available to achieve the PIC spectrometer system.

Figure 4:
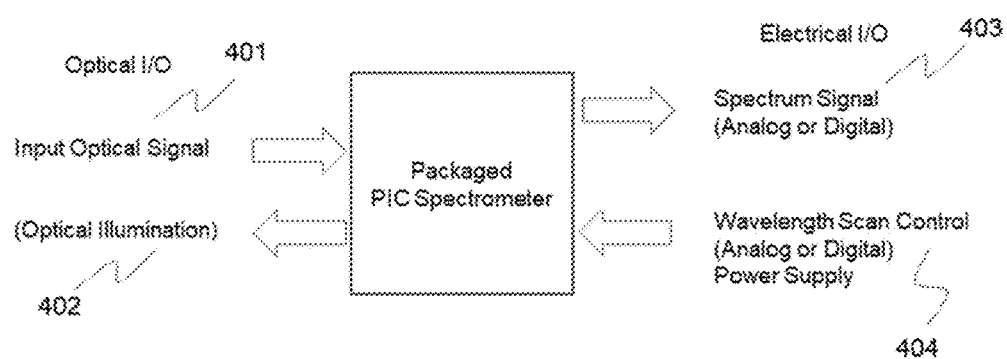
FIG. 4 depicts a schematic diagram of the PIC spectrometer expressing the potential device configuration focusing on its input/output ports.

Once packaged, this PIC spectrometer requires only a few electronic I/O pins and optical I/O ports. FIG. 4 shows the potential I/O configuration for such devices. For optical I/O, optical signal comes through optical input port 401, as an option, the device could integrate the illumination function 402. For electrical I/O, spectrum information could be output as an analog signal via single pin or multiple pins 403. With a communication IC integrated, digital output of spectrum information is available too. The dispersive function scanning signal 404 can control the scan directly as an analog signal, or by digitally coded signal via internal circuitry. Lastly, the power supply pin 404 concludes all the I/O pins required for this device.

Figure 5:
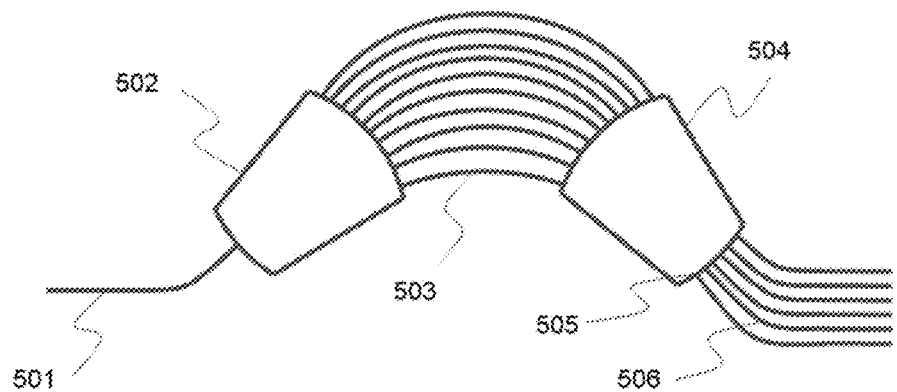
FIG. 5 depicts an example configuration of AWG.

An AWG is commonly used in optical communication systems to combine or to separate various wavelength signals in wavelength division multiplexing (WDM). An AWG has three sections in the design, FIG. 5. An input waveguide 501 is connected to the first free propagation region (FPR) 502 where the input signal is distributed to multiple waveguides 503. The second section 503 called waveguide grating has multiple waveguides with various lengths. The length difference between the waveguides is designed to image a spectral pattern at the output. Then the waveguides in said waveguide grating are connected to the second FPR 504. The end of the FPR is the imaging plane 505 for the output waveguide inputs. At the imaging plane, spectral information of the input signal is projected in the spatial domain. Depending on the position of the output waveguide 506, the output signal contains specific spectral components of the input optical signal.

Figure 6:
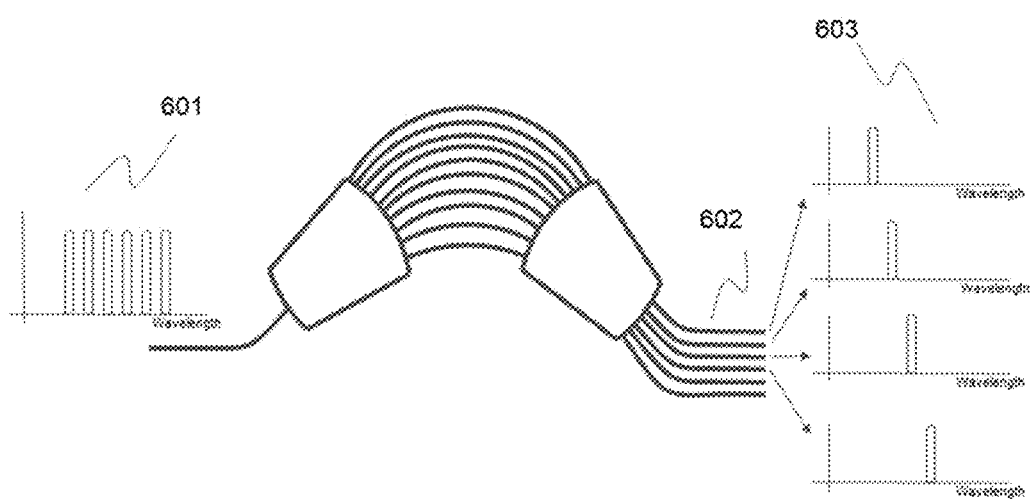
FIG. 6 depicts the dispersive function of AWG.

FIG. 6 depicts the function of AWG. When the input optical signal contains a wide spectrum or multiple wavelength bands in its spectral 601, AWG with multiple output wavelengths 602 separates and distributes the section of the spectrum or the wavelength bands into each output waveguides 603.

Figure 7:
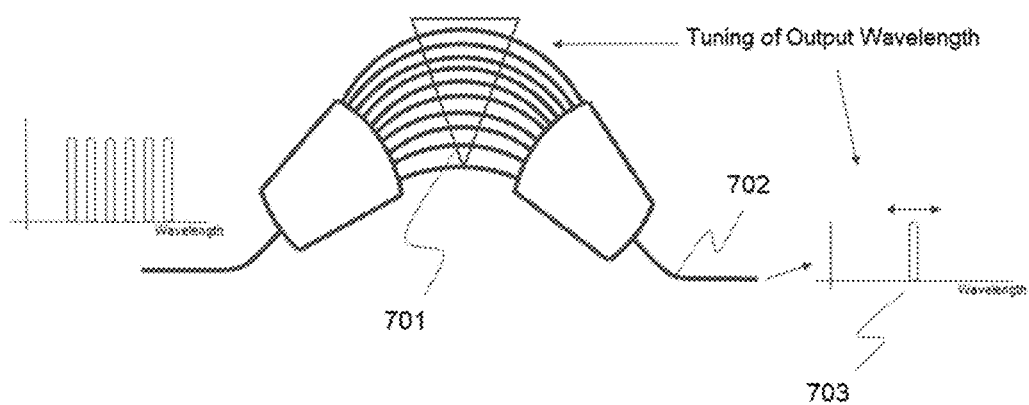
FIG. 7 depicts the wavelength scanning functionality of AWG.

For a single output configuration, the output of the AWG is a single waveguide 702. In FIG. 7, the conversion or mapping of wavelength domain information into time domain signal is depicted. When the phase of optical signals in AWG grating arms is tuned properly, the wavelength range of output signal in the single output waveguide changes 703. By controlling the tuning over time, the time-varying signal at the output 703 represents the spectral information of the input optical signal.

The position and size of the AWG output waveguide determine the central wavelength and the resolution, i.e. spectral bandwidth coupled into the output waveguide, of the spectrometer output. For multi-resolution output configurations, the output of the AWG has several waveguides with various widths. A narrow output waveguide passes a fine-resolution signal, and a wide output waveguide passes a coarse-resolution signal. For multi-output configurations, the output of the AWG has several substantially identical waveguides at specific positions.

Several operation modes of the PIC spectrometer are within the scope of the embodiments. A single output configuration can be operated in two modes: (1) Constant scan mode—in this operation mode, the scanning of the AWG tuning is done at an essentially constant speed; this generates a time-varying, periodic signal output with a constant periodicity; each period is the complete spectral information within the spectral range determined by the scan amplitude and the initial bandpass filter; this operation is the simplest mode; (2) Variable scan mode—in this operation mode, the scanning of the AWG tuning is adjusted based on the signal detected, or external information provided; either way, the intention is to optimize the integration time for each measurement point to maximize the signal-to-noise ratio (SNR) for the specific input signal; for example, when the input signal is strong, scanning can be performed at a fast rate so that (a) high contrast in the output signal and (b) high resolution in the timing are obtained at the same time; this performance is desirable when the spectral information in the input signal is varying rapidly; when the input signal is weak, longer integration can be performed in order to maximize the SNR; the scanning speed should be slower for such cases; in both modes, with a single output waveguide, the resolution of the spectrum is essentially similar. For both these operation modes, the control of tuning and the integration of detected signals can be done inside of this spectrometer device or outside from the external hardware or software.

Figure 8:
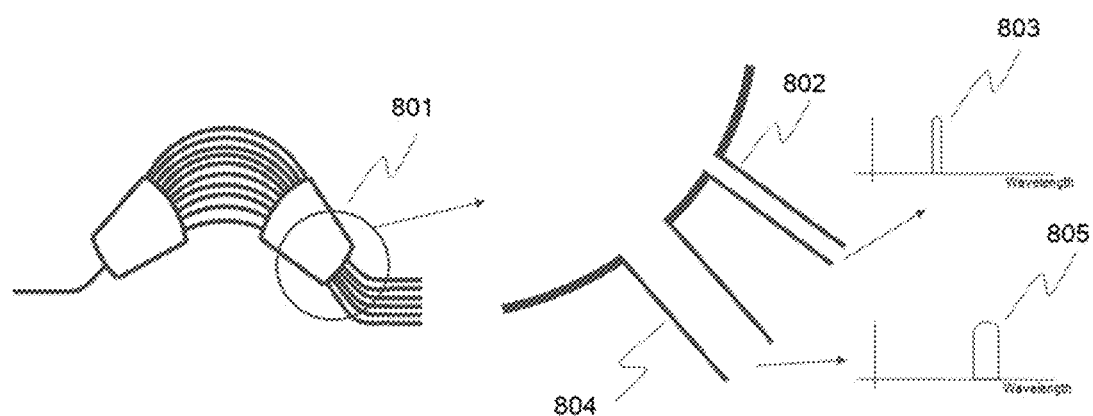
FIG. 8 depicts an output configuration of AWG. In this configuration, multiple output waveguides with different widths are placed at the output of the free propagation region. This configuration enables an additional operation mode of the PIC spectrometer.

With multiple output waveguides at various widths, the device operates in multi-resolution output mode. In this configuration, the PIC chip includes multiple output ports or a single output port with a switching circuit, making the device larger than a single output device, however it benefits from the ability of collecting additional information simultaneously. In FIG. 8, each of the waveguides 802, 804 with different widths at the output of the AWG passes signals that represent the integrated values over corresponding wavelength ranges. Namely, a narrow waveguide 802 passes information that represents a narrow wavelength range 803, and a wide waveguide 804 passes information that represents a wide wavelength range 805. With the positions of the output waveguides being different, the central wavelength passing through each output waveguide is different, requiring separate calibration. With this configuration, the spectrometer can provide multiple resolution outputs at the same time. The time integration duration adjustment capability is maintained in this configuration. This configuration allows for faster and more detailed spectroscopy. The tradeoff is a slight increase in size, though the size advantage over the prior art remains significant.

Figure 9:
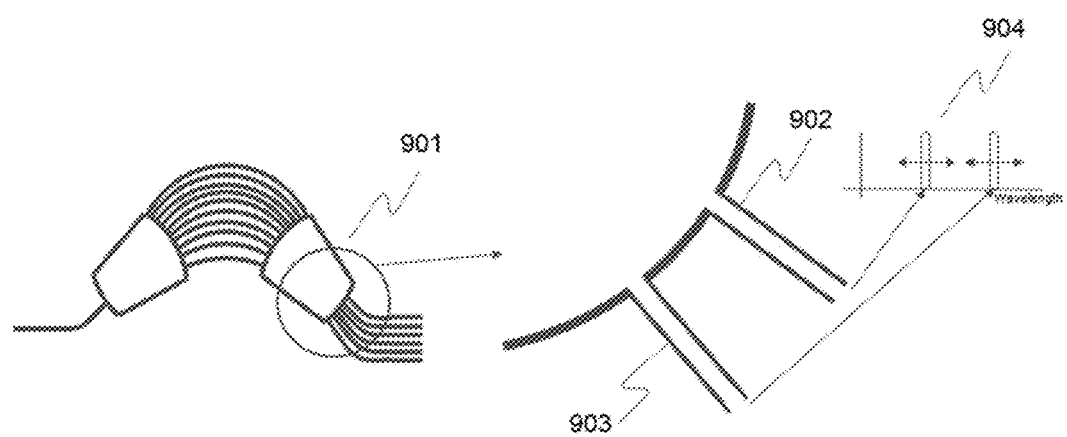
FIG. 9 depicts another output configuration of AWG. Multiple waveguides with the same width are placed at a strategic position to enable fast scan operation.

A device can also have multiple waveguides with essentially the same width as shown in FIG. 9. The advantage of this configuration is that a faster data rate can be achieved, at the expense of a slightly larger form factor. The size increase is due to the increase in the number of photodiodes (PDs) and the number of output pins. With the multiple waveguides capturing signals at different positions 902, 903, each waveguide scans a narrow range 904. This configuration improves the scanning speed. The tradeoff is a slight increase in size and in cost, though the size and cost advantages over the prior art remain significant.

Given the size advantage of the embodiments, suitable applications are in mobile portable devices or in systems requiring lower power consumption of the spectrometer.

A drone with a gas sensor can be deployed in chemical plants, oil and gas fields/refineries/pipelines, and populated areas, to survey and to detect potentially explosive gas leaks. For such an application, the sensors must be lightweight and have low power consumption so that the flight time of the drone is sufficient to survey large premises efficiently. A PIC spectrometer is more suitable than conventional spectrometers due to the size, weight, power consumption and cost advantages.

For mobile applications such as cell phones, the form factor is one of the most important parameters. Conventional spectrometers are too bulky to fit into the very limited space in mobile devices. A PIC spectrometer is compact and is packaged in a manner similar to other chips in mobiles devices. The low power consumption is also an important consideration for battery-powered devices, and the cost is important especially in consumer mobile devices.

What is claimed is:

1. A photonic integrated circuit chip spectrometer for sensing the spectroscopic signature of input optical signals, comprising:
    a single input port for said input optical signals, the single input port being an input waveguide;
    at least one optical filter to select a spectral range of interest;
    at least one dispersive element to separate spectral information spatially;
    at least one tuning element for said dispersive element to convert the spectral information to time-dependent information;
    at least one output port, the at least one output port being an output waveguide, wherein the at least one optical filter, at least one dispersive element, and the at least one tuning element are positioned between the input waveguide and the output waveguide on the photonic integrated circuit chip; and
    at least one photodetector to convert optical signals into electrical signals.

2. The photonic integrated circuit chip spectrometer of claim 1 wherein said input waveguide is configured to receive the input optical signals, the input waveguide being coupled by a coupling element selected from a set of elements comprising but not limited to:
    a grating fabricated on a surface of the photonic integrated circuit chip;
    a tapered waveguide at the edge of the chip;
    a refractive lens;
    a diffractive lens;
    an optical fiber.

3. The photonic integrated circuit chip spectrometer of claim 1 wherein said at least one optical filter is selected from a set of elements comprising but not limited to:
    a directional coupler;
    a diffraction grating;
    a multimode interference coupler;
    a Mach-Zehnder interferometer;
    an arrayed waveguide grating;
    a thin film filter inserted in a slit fabricated in said photonic integrated circuit chip.

4. The photonic integrated circuit chip spectrometer of claim 1 wherein said at least one dispersive element is selected from a set of elements comprising but not limited to:
    an arrayed waveguide grating;
    a diffraction grating;
    a refractive prism;
    a poled domain prism.

5. The photonic integrated circuit chip spectrometer of claim 1 wherein said at least one tuning element is selected from a set of elements comprising but not limited to:
    electrical heaters at arrayed waveguide grating arms, when used;
    electrical heaters at diffractive gratings, when used;
    electrical capacitor at array waveguide grating arms, when used;
    electrical current at array waveguide grating arms, when used;
    electrical capacitor at the poled domain prism, when used.

6. The photonic integrated circuit chip spectrometer of claim 1 wherein said at least one photodetector is selected from a set of elements comprising but not limited to:
    photodetector on said photonic integrated circuit chip;
    photodetector on a printed circuit board.

7. The photonic integrated circuit chip spectrometer of claim 6 wherein a plurality of photodetectors are used and are configured from a set of configurations comprising but not limited to:
    multiple photodetectors are used for multiple output waveguides;
    a photodetector array is used for multiple output waveguides.

8. The photonic integrated circuit chip spectrometer of claim 1 wherein said at least one at least one output port is selected from a set of configurations comprising but not limited to:
    waveguides at specific spatial locations to capture the signals from said at least one dispersive element;
    a single waveguide;
    multiple waveguides with different widths;
    multiple waveguides with a specific spacing between them.

9. A method for a photonic integrated circuit chip spectrometer for sensing the spectroscopic signature of input optical signals, comprising:
    receiving, via a single input port, the input optical signals, the single input port being an input waveguide;

selecting, via at least one optical filter, a spectral range of interest;
separating, via at least one dispersive element, spectral information spatially;
converting, via at least one tuning element for said at least one dispersive element, the spatially separated spectral information to time-dependent information;
outputting, via at least one output waveguide, the time-dependent information, wherein the at least one optical filter, at least one dispersive element, and the at least one tuning element are positioned between the input waveguide and the output waveguide on the photonic integrated circuit chip;
converting, via at least one photodetector, the input optical signals into electrical signals.

* * * * *